United States Patent [19]
Hoffman

[11] 3,840,988
[45] Oct. 15, 1974

[54] SUSPENSION STRAP CUTTING APPARATUS

[75] Inventor: Norman H. Hoffman, Eden Prairie, Minn.

[73] Assignee: Technical Ordnance, Inc., Minneapolis, Minn.

[22] Filed: Aug. 22, 1973

[21] Appl. No.: 390,385

[52] U.S. Cl.................. 30/180, 244/151 B, 83/639
[51] Int. Cl............................................. B64d 17/38
[58] Field of Search............ 30/180, 277, 228, 231; 83/444, 639; 244/151 B

[56] References Cited
UNITED STATES PATENTS
| | | | |
|---|---|---|---|
| 2,755,550 | 7/1956 | Benjamin | 30/180 |
| 3,335,493 | 8/1967 | Gallagher | 30/180 |
| 3,763,738 | 10/1973 | Temple | 30/228 |

FOREIGN PATENTS OR APPLICATIONS
991,255    5/1965    Great Britain...................... 30/180

Primary Examiner—Al Lawrence Smith
Assistant Examiner—J. C. Peters
Attorney, Agent, or Firm—Leo Gregory

[57] ABSTRACT

An apparatus to release a cargo from a parachute consisting of a strong frame member, a shaft adapted to support substantial weight carried by said frame member, a weight bearing suspension strap secured to said shaft, a housing carried by said frame members having a strap cutting member disposed therein, explosive means carried by said housing driving said strap cutting member, means actuating said explosive means and means formed in said frame member guiding said strap cutting member.

2 Claims, 10 Drawing Figures

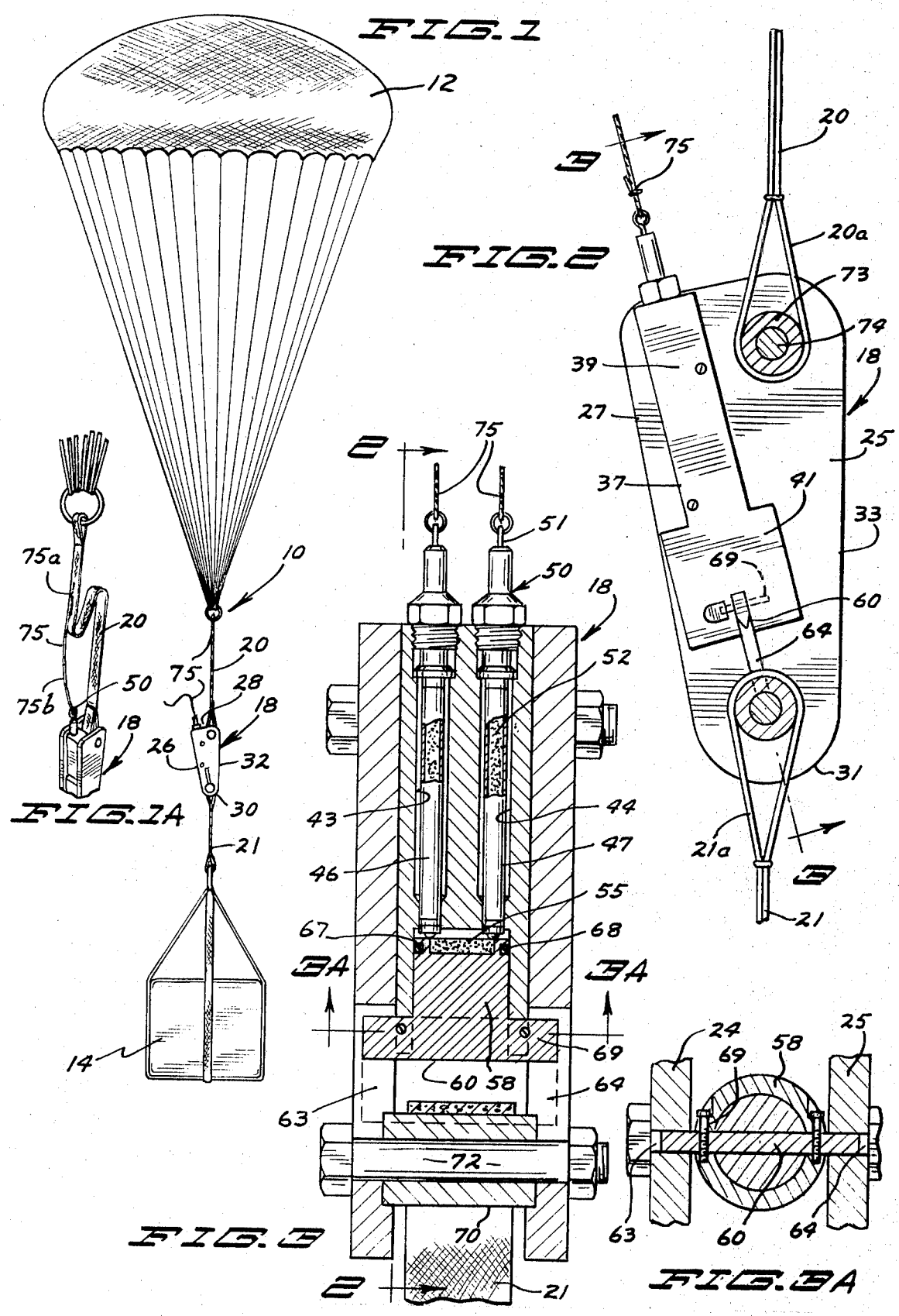

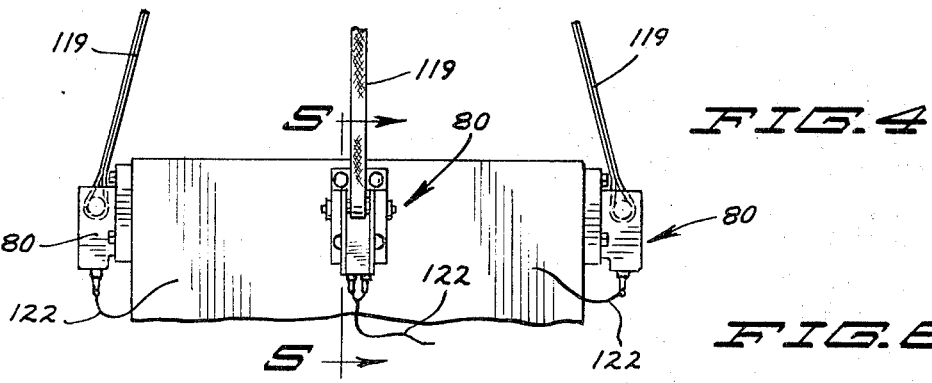
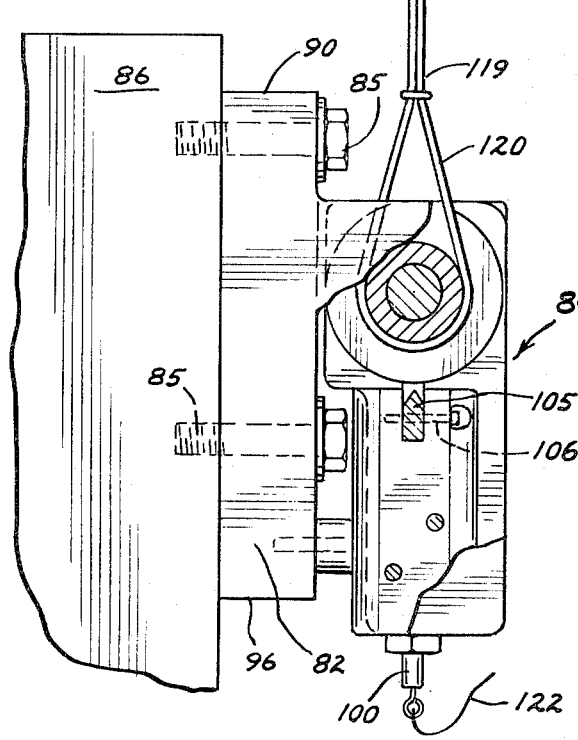
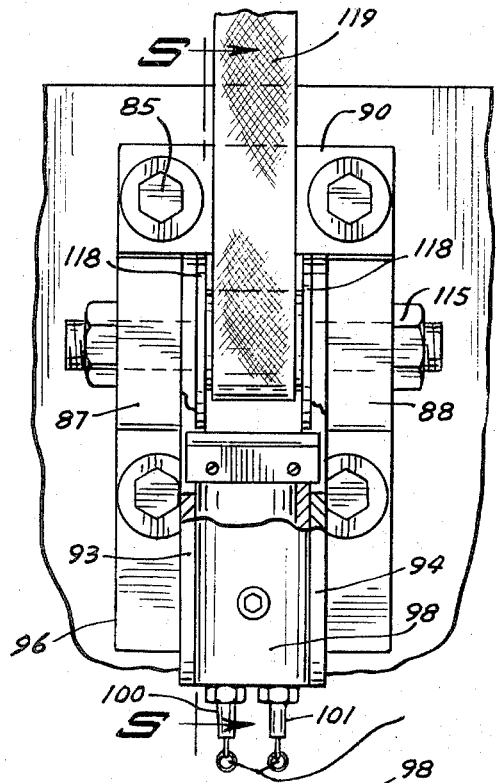
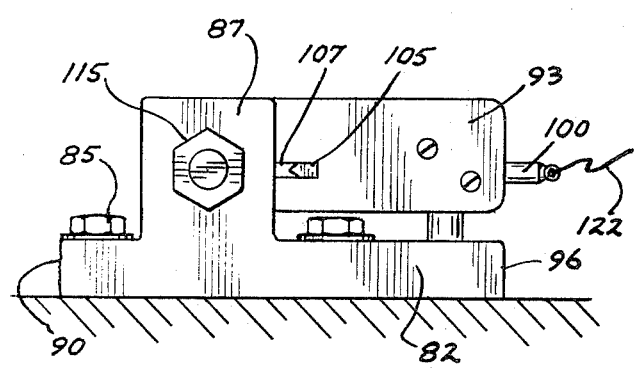
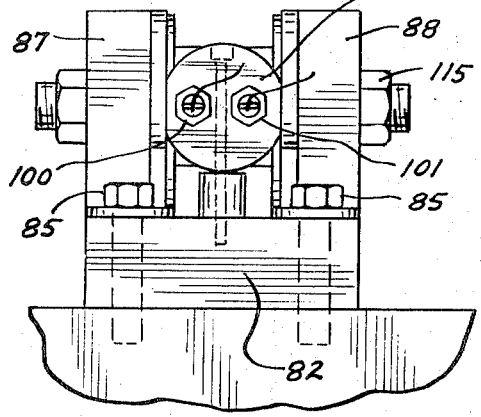

SUSPENSION STRAP CUTTING APPARATUS

SUMMARY AND BACKGROUND OF THE INVENTION

The art involved with respect to parachute apparatus for carrying cargo and means for releasing such cargo represents an active art. Much of the development in the art has to do with handling cargo which is not of great weight.

The improvement with respect to the apparatus herein has to do with its particular arrangement and construction to handle heavy loads of cargo such as may run into weight of thirty tons or more.

It is an object of this invention to provide a frame structure arranged and constructed to carry very substantial weight and to have disposed therein cutting means to cut suspension lines holding said weight, said cutting means being free of any stress caused by the weight carried.

It is also an object of the invention herein to provide an apparatus such as is set forth in the preceding object in which means actuating said cutting means drive said cutting means with sufficient force to cut heavy layered suspension lines.

More specifically, it is an object of the invention herein to provide an apparatus comprising a pair of spaced frame members of substantial strength, a substantial shaft forming a suspension line holding member carried by said frame members, a housing carried by said frame members independent of said shaft, a cutting member carried in said housing, means carried by said frame members guiding said cutting member into cutting engagement with said suspension line and an explosive means comprising a time delay charge driving said cutter member to cut said suspension line.

These and other objects and advantages of the invention will be set forth in the following description made in connection with the accompanying drawings in which like reference characters refer to similar parts throughout the several views and in which:

FIG. 1 is a view of the apparatus herein in operating position;

FIG. 1A is a broken view in perspective on a reduced scale showing in operating position a portion of the above apparatus;

FIG. 2 is a view of the structure herein in longitudinal section as taken on line 2—2 of FIG. 3 with portions thereof being broken away;

FIG. 3 is a view in longitudinal section taken on line 3—3 of FIG. 2 as indicated with portions thereof being broken away;

FIG. 3A is a view in cross-section taken on line 3A—3A of FIG. 3 as indicated;

FIG. 4 is a view in side elevation showing a multiple of a modified form of the apparatus herein in operating position with some portions thereof being broken away;

FIG. 5 is a view in section taken on line 5—5 of FIG. 6 as indicated; FIG. 6 is a top plan view of the modified form of the apparatus herein with portion thereof being broken away;

FIG. 7 is a view in front end elevation with portions thereof being broken away, and FIG. 8 is a view in side elevation.

DESCRIPTION OF A PREFERRED EMBODIMENT

Referring to FIG. 1-3A, a preferred embodiment of the structure herein is shown in operating position in the arrangement as indicated by the reference numeral 10.

Said arrangement 10 comprises a cargo carrying parachute 12 of conventional design, a suitable type of cargo carrier 14 or the cargo itself as the case may be and the apparatus 18 which comprises the subject matter of the invention herein. Said apparatus 18 is shown linked to said parachute by a strap 20 of suitable design and strength and a strap 22 is shown extending from said apparatus to said cargo carrier suspended therefrom.

Said apparatus 18 comprises a pair of parallel spaced side plate frame members 24 and 25 having bottom edge walls 26 and 27, upstanding rear end walls 28 and 29, tapered front end walls 30 and 31 and having top edge walls 32 and 33.

Mounted between said plate members adjacent to the bottom walls thereof and secured thereto by metal screws 35 is a housing 37 having an elongated body portion 39 here indicated as being rectangular in cross-section as a matter of design only and having a forward end portion 41 thereof cylindrical in form.

Extending through said body portion 39 in transverse spaced relation are cylindrical passages 43 and 44 within which are disposed cartridges 46 and 47 commonly used in this art and of which the cartridge 47 will be further described. Said cartridge 47 comprises a firing mechanism 50 of which a firing pin 51 is indicated and a percussion primer therein is not shown. An ignition pyrotechnic delay material 52 is loaded into said cartridge, in connection with both cartridges, a propellant bag 55 is provided containing the explosive material to drive a cutting member and it is seated adjacent said cutting member which will be described. The number of cartridges indicated is a matter of design.

Disposed in the cylindrical portion 41 of said housing is an anvil or cutting member 57 having a cylindrical base or rear portion 58 and projecting forwardly thereof a cutting blade 60. Said blade 60 has a greater transverse dimension or width than said cylindrical base portion 58. The extended end portions 60A and 60B of said blade are disposed in opposed aligned guide slots 63 and 64 respectively formed in said side plate members 24 and 25 as best shown in FIGS. 3 and 3A.

An annular groove 67 is formed about the inner end of said rear portion 58 about which a seal ring 68 is disposed and is here shown in the form of an O-ring.

Adjacent each extended end portion of said blade is disposed a shear pin 69 extending therethrough and into the adjacent housing.

A roller or tubular shaft member 70 is disposed between said plate members 24 and 25 adjacent the ends of said slots 63 and 64 remote from said blade 60. Said shaft member is secured in position by an appropriate nutted bolt 72 extending therethrough and through said plate members 24 and 25. The strap member 21 has a loop portion 21A thereof disposed about said shaft 70 and said strip extends to the cargo carrier 14.

A second roller or tubular shaft member 73 is disposed between said plate members 24 and 25 adjacent the ends thereof remote from said first-mentioned shaft member with the axis thereof here shown being aligned with the axis of said first-mentioned shaft member in a plane parallel to the plane of the member is secured between said plate members by a nutted bolt 74 as described in connection with said first-mentioned bolt 72. Said strap member 20 which extends from said parachute 12 has a loop portion 20A thereof disposed about said shaft member 73.

The plate members 24 and 25, the shaft members 70 and 73, the bolt members 72 and 74 and said strap members 20 and 21 taken in their operating relationships are of sufficient structural strength to support a cargo of many tons in suspension from said cargo parachute 12.

The strap members are preferably formed of nylon webbing with each layer thereof having a capability of supporting on the order of 15,000 pounds and with the strap member in assembled condition being capable of supporting on the order of 60,000 pounds or more which is on the order of thirty tons of cargo weight. The shaft members as mounted between the frame members 24 and 25 are constructed to support the weight indicated.

As indicated in FIG. 1A, a line or lanyard 75 has one end 75A thereof secured to an upper portion of said strap 20. The lower end 75B of said line 75 is secured to the firing mechanism 50. Said lanyard 75 is of relatively short length and when in operating position a shown in FIG. 1A, it will form a doubled up or slack portion in the strap 20. Thus, when the parachute and cargo are disposed overboard from a carrier plane, the cargo will immediately fall free to exert a load onto said strap 20 to pull the same its full length to a taut condition and thus the lanyard 75 will be caused to be jerked to actuate the firing mechanism 50. For example, a 30 to 40 lb. pull force for a onehalf inch travel is all that is required to actuate the firing mechanism 50 by a pull on its firing pins. The lanyard is subsequently broken as the strap 20 is pulled to its full length.

OPERATION

The apparatus herein is intended for landing heavy cargoes such as on the order of many tons of weight. It is intended that the cargo be released from the parachute as closely as possible in time to the moment of contact of the cargo with its landing surface whether it be land or water.

The pyrotechnic material 52 representing a fuse action has a delay firing capability which is timed with respect to the height from which the cargo will be dropped from a carrier plane and the speed of its descent. This is known art and does not form a part of the invention herein.

The invention herein has to do particularly with the strap cutting apparatus. The straps used are of substantial thickness to provide the strength required. An apparatus of great strength is required to form a link between the parachute and the cargo. The straps must be of sufficient strength as above described, the frame of the apparatus must be capable of supporting the weight indicated as a link between the parachute and the cargo and the cutting member must be capable of instantly cutting without fail the strap to release the cargo.

The housing 37 containing the firing mechanism and the cutting member is free from any strain of the cargo. The capacity of said housing is designed to be sufficient to contain an explosive charge of such magnitude as to drive the cutting member 57 and the blade 60 with the requisite force to quickly sever the strap loop portion 21A disposed about said shaft member 70. The cutting blade is guided by said slots 63 and 64.

Upon the lanyard being jerked as above described, the firing mechanism is actuated to ignite the pyrotechnic material which will burn for a predetermined period of time and which is timed to ignite the explosive charge 55 to drive the cutting blade 60 to cut or sever the suspension strap 20 just as the cargo is closely approaching contact with its landing surface.

MODIFICATION

A modified form of the structure herein is illustrated in FIGS. 4-8. This modified form of apparatus is adapted to be directly secured to the cargo and suspended from a parachute and is freed from the parachute and remains with the cargo.

The apparatus herein is indicated generally by the reference numeral 80 and comprises a substantial base portion 82 apertured to have bolts 85 extend therethrough to secure the same appropriately to a cargo carrier or cargo as indicated by the reference numeral 86.

Said base portion 82 has a pair of transversely spaced parallel upstanding side frame portions 87 and 88 which are integral therewith and are spaced forwardly in the direction of the end portion 90 of base portion 82. Mounted onto the facing sides of said frame portions 87 and 88 are a pair of elongated plate members 93 and 94 extending rearwardly of the rear edge portion 96 of said base portion.

Mounted between said plate members 93 and 94 and secured thereto by appropriate bolts is a housing 98 similar in structure to said housing 37 above described and without further description is indicated as including cartridges 100 and 101 of the same structure as cartridges 46 and 47 above described together with the pyrotechnic delay material and the propellant bag described in connection therewith.

Carried in said housing 98 in the same manner as in connection with said housing 37 is a cutting member 105 guided between a pair of slots formed in said plate members 93 and 94 such as indicated by slot 107 in plate member 93 and is releasably secured by shear pins as shown by shear pins 106.

Disposed between said upstanding frame portions 87 and 88 and between said plate members 93 and 94 forwardly of said housing 98 is a tubular shaft member 110 secured in position by a bolt 112 extending therethrough and through said frame portions 87 and 88 and being secured externally thereof as shown by appropriate nuts 115 at either extended end thereof. Mounted on said tubular shaft 110 adjacent the inner sides of said plate members 93 and 94 are a pair of substantially friction free washers 118 made of a suitable material such as Teflon.

Secured to said tubular shaft 110 by hving a loop portion 120 thereof disposed thereabout is a strap member 119 on the order of said strap members 20 and 21.

With reference to FIG. 4, several of said apparatus 80 are shown supporting a common cargo. Each holding apparatus 80 will have its strap member run to a common parachute.

The strap member 119 is shown having a lanyard running to the firing mechanism of the cartridges 100–101 for operation as first above described.

The operation of the modified apparatus is as described in connection with the first embodiment herein.

The apparatus herein has proved to be very successful in tests made thereof under operating conditions above indicated.

Thus, it is seen that there has been provided a substantial and heavy-duty suspension apparatus for parachute borne cargo.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A suspension member cutting apparatus for a parachute supported cargo having in combination
   a frame comprising a pair of parallel spaced plate members,
   a shaft member disposed between said plate members,
   a suspension member having a portion thereof secured about said shaft,
   a housing carried between said plate members independent of said shaft,
   a cutting member disposed in said housing movable to engage and cut said suspension member portion about said shaft member,
   said cutting member including a cutting edge portion having transversely extended end portions,
   said plate members having a pair of opposed aligned slots therein receiving and guiding said extended end portions of said cutting edge portion,
   said housing including means to operate said cutting member,
   means actuating said last mentioned means,
   a second shaft disposed between said plate members spaced from said first mentioned shaft member,
   a suspension member having a portion thereof secured to said second shaft member, and
   said suspension members respectively running to a parachute and to a suspended cargo.

2. A suspension member cutting apparatus for a parachute supported cargo having in combination
   a pair of spaced plate members,
   means connecting said plate members and securing the same to a cargo,
   a housing mounted between said plate members,
   a shaft member disposed between said plate members spaced from said housing,
   a suspension member secured to said shaft,
   a cutting member in operative association with said housing and having a cutting edge portion engaging said shaft, and
   actuating means carried by said housing driving said cutting member.

* * * * *